US005925267A

United States Patent [19]

Kitahashi

[11] Patent Number: 5,925,267

[45] Date of Patent: Jul. 20, 1999

[54] PLASMA TORCH HAVING A BYPASS UNIT

[75] Inventor: Masamitsu Kitahashi, Kanagawa, Japan

[73] Assignee: Komatsu Ltd., Tokyo, Japan

[21] Appl. No.: 08/973,753

[22] PCT Filed: Jul. 12, 1996

[86] PCT No.: PCT/JP96/01961

§ 371 Date: Dec. 23, 1997

§ 102(e) Date: Dec. 23, 1997

[87] PCT Pub. No.: WO97/02919

PCT Pub. Date: Jan. 30, 1997

[30] Foreign Application Priority Data

Jul. 12, 1995 [JP] Japan .................................... 7-176042

[51] Int. Cl.[6] ..................................................... B23K 10/00

[52] U.S. Cl. ............................... 219/121.57; 219/121.54; 219/121.48; 219/130.4

[58] Field of Search ......................... 219/121.54, 121.55, 219/121.57, 130.4, 121.48, 121.59, 121.44, 74, 75

[56] References Cited

U.S. PATENT DOCUMENTS

| | | | |
|---|---|---|---|
| 5,183,990 | 2/1993 | Enyedy | 219/121.54 |
| 5,416,297 | 5/1995 | Luo et al. | 219/121.57 |
| 5,530,220 | 6/1996 | Tatham | 219/121.57 |
| 5,620,617 | 4/1997 | Borowy et al. | 219/121.54 |

FOREIGN PATENT DOCUMENTS

| | | |
|---|---|---|
| 61-216861 | 9/1986 | Japan . |
| 2-39657 | 10/1990 | Japan . |
| 3-9902 | 3/1991 | Japan . |
| 7-16752 | 1/1995 | Japan . |

*Primary Examiner*—Mark Paschall

*Attorney, Agent, or Firm*—Nikaido Marmelstein Murray & Oram, LLP

[57] ABSTRACT

There is disclosed a plasma torch for performing a working operation with respect to a workpiece (8) by flushing out of a torch nozzle (2), a plasma arc drawn from an electrode (1) together with a working gas that is introduced from a periphery of the electrode while holding a portion of the plasma torch substantially in contact with the workpiece, in which at least that portion of said plasma torch which may make a contact with the workpiece is composed of a non-insulating member and in which a high frequency current bypassing unit (12) is disposed between a site of the plasma torch that is equal in electric potential to the torch nozzle and a site of the plasma torch that is equal in electric potential to the workpiece.

5 Claims, 2 Drawing Sheets

PLASMA TORCH HAVING A BYPASS UNIT

TECHNICAL FIELD

The present invention relates to a plasma torch that is designed to effect a welding or a cutting operation for a workpiece while bringing a portion of the plasma torch in contact with the workpiece.

BACKGROUND ART

In a plasma welding or process, where the resulting weld or cut quality is of a prime importance, it has been known to be necessary to perform the operation with a plasma torch while maintaining the distance between a nozzle forward end thereof and a workpiece, i.e. a standoff, constant. Thus, a plasma torch has typically been employed having a member that is mounted to a body portion thereof and designed to surround a nozzle forward end thereof, and such a plasma torch has been configured in a construction as disclosed in Japanese Examined Patent Publication No. Hei 3-9902 and Japanese Unexamined Patent Publication No. Hei 7-16752 in the prior art.

And, in a conventional plasma torch as disclosed in the former publication above, it can be noted that a spring member composed of a material having a heat resistant property is externally provided on the body of the plasma torch to form a coiled spring thereon whose leg end, extending downwards beyond the nozzle forward end, can be urged to engage with a workpiece so as to cut the workpiece. In another conventional plasma torch as disclosed in the latter publication above, it can be noted that the end of a retention cap mounted to the torch end extends downwards beyond the nozzle forward end and is urged to engage with a workpiece so as to spot weld the workpiece with another workpiece.

In these techniques in the prior art, however, it is recognized that a member as provided on a plasma torch and urged to engage with a workpiece must be subjected to a considerably elevated temperature that is brought by a heat of the plasma arc and a heat conducted from the workpiece. Thus, even if such a member contacting the workpiece is composed of a ceramic material to constitute a cap as have been used for a plasma torch and so forth, the contacting member is found to be disadvantageous on account of the productivity and the running cost because it tends to be broken or cracked.

On the other hand, in a case where the contacting member is composed especially of a metal, such as copper, having a high thermal conductivity, the member that is naturally of a non-insulating body allows a high frequency electric current that may be brought about when a plasma arc is started to leak therethrough into the workpiece, thus giving rise to a problem such as tending to develop an abnormal discharge or to make a plasma arc hard to develop.

In order to resolve the problem arising from leakage of such a high frequency current, it has been proposed as disclosed in Japanese Examined Utility Model Publication No. Hei 2-39657 that there be provided, between the end of a body portion of the plasma torch and the end of an insulating cap disposed coaxially to surround its nozzle portion with a spacing through which a shielding gas is allowed to pass, a protective packing that is composed of an insulating material and arranged to surround these two end portions so that the high frequency current may not leak through the gap between the torch body and the insulating cap into a region of the workpiece.

More specifically, a plasma torch as disclosed in the above mentioned utility model publication makes use of a packing interposed between the end of a torch body portion of the plasma torch and the end of an insulating cap disposed to coaxially surround a nozzle portion of the plasma torch with a spacing that is traversed by a shielding gas, where the packing is composed of an electrically insulating and heat resistant material such as to prevent a high frequency current from leaking from a region of the plasma torch into a region of the workpiece, and hence to prevent a development of any abnormal discharge.

With the use of a plasma torch of such a construction to carry out a welding or cutting operation for a workpiece while bringing a portion of the torch (here the insulating cap) in contact with the workpiece, it has nevertheless been found that the torch, even if its insulating cap is composed of a heat resistant material such as a ceramic, remains poor in the heat resistant property and hence its life is still extremely short as it is exposed to a plasma arc whose temperature is rising to as high as several ten thousand degrees.

In order to overcome the heat resistance problem, it has been proposed that the cap be composed of a metallic material that is good in thermal conduction and yet be cooled by water while the operation is being performed. Yet with such a measure, however, it has been found that the problem of a high frequency current leaking via the metallic cap into the region of a workpiece and hence the problems of development of an abnormal discharge and failure for an arc plasma to ignite may still be encountered.

At this point an explanation of a plasma arc process that has been employed with an assisting metallic cap in the prior art may be advisable.

A plasma arc with a plasma torch can be started with an arc current of low amperage, commonly referred to as "pilot arc", that is initially produced between an electrode and a torch nozzle of the plasma torch, the pilot arc being then allowed to reach a workpiece and thence to shift into a main arc that is produced between the electrode and the workpiece.

The main arc is called "plasma arc" because of its nature, and is characterized by an extremely elevated energy density and a high arc directivity.

An explanation of a mechanism whereby a plasma arc as mentioned above is allowed to ignite can be given with reference to FIG. 1 of the drawings attached hereto.

In order for a plasma arc to be ignited, it can thus be seen that a pilot arc needs to be developed between the electrode 1 and the torch nozzle 2. An arc turn-over switch 3 then remains closed, establishing a circuit in which current is allowed to flow from the turn-over switch 3 through a high frequency generator 5, the torch nozzle 2, a dielectric space 6 and the electrode 1 to a direct current (DC) power supply 4.

It should be noted, however, that to this end and thus to cause a pilot current to pass through this circuit the dielectric space 6 which lies between the electrode 1 and the torch nozzle 2 (and is filled up with a plasma gas) then must be broken down.

Accordingly, when a pilot arc is started, it will be required for a high frequency (HF) power with an extremely high voltage generated by a HF power supply (not shown) to be applied to the primary winding of a HF generator 5 to establish a resonant circuit which is formed by the HF generator 5, a capacitor 7*a*, the electrode 1, the torch nozzle 2 and the HF generator 5 that are connected in series, thereby allowing an elevated voltage HF current to be applied across the electrode 1 and the torch nozzle 2, thus permitting the dielectric space 6 to be broken down to establish a circuit for a pilot arc.

With the pilot arc then arriving at a workpiece 8, it follows that a main arc circuit will be established which is formed by the DC power supply 4, an ammeter 9, the workpiece 8, the electrode 1 and the DC power supply 4 that are connected in series. Here, the ammeter 9 is operative to detect a current that is indicative of the formation of this main arc circuit. Therefore, the switch 3 is turned off thereafter, thereby rendering the above mentioned pilot arc circuit in an open condition to extinguish any pilot arc and to allow it to shift into a main arc. It should also be noted that a second capacitor 7*b* is provided to isolate the HF current from the DC power supply 4 and the nozzle cap is indicated at 10*a*.

While FIG. 1 shows an example of circuit construction in which the HF generator 5 is connected to the torch nozzle 2, it should be noted that in another example of circuit construction the HF generator 5 may alternatively be connected to the electrode 1 as shown in FIG. 3. As will be appreciated, the mechanism for arc generation in the FIG. 1 example as discussed in connection therewith equally applies to the latter example as well.

Next, the mechanism for an arc ignition that is effected in the process of cutting or welding a workpiece while holding a standoff retention contact type cap 10*b* of the plasma torch in contact with a workpiece 8, may be explained with reference to FIG. 2 and in connection with the electrical circuit shown therein.

It has already been pointed that a standoff retention contact type cap 10*b* of the plasma torch of the type described, if composed of a ceramic or the like material on account of its required heat resistant property, leaves much to be desired as to the reliability, the running cost and so forth of a working operation. Note particularly that a ceramic is highly expensive and its utilization in such a manner may render the running cost of a process even prohibitive.

As a consequence, a need may arise that the standoff retention contact type cap 10*b* be composed of a metallic material having a high thermal conductivity. If so composed, the standoff retention contact type cap 10*b* will be placed at a same potential as the workpiece 8 and when the HF power supply is allowed to start its operation, it follows that the first circuit which is constituted by the electrode 1—the capacitor 7*a*—the HF generator 5—the torch coil 2—the dielectric space 6—the electrode 1 in series and the second circuit which is constituted by the standoff retention contact type cap 10*b*—the workpiece 8—the capacitor 7*b*—the HF generator 5—the torch nozzle 2—a second dielectric space 11—the standoff retention contact type cap 10*b* in series will be made structurally and functionally equivalent to each other as a whole.

For this reason, if a dielectric breakdown across the spacing 11 between the torch nozzle 2 and the standoff retention contact cap 10*b* happens to have been effected with an HF current prepared originally for effecting a dielectric breakdown across the space 6 between the electrode 1 and the torch nozzle 2, there will be no pilot arc produced or possibly ignited.

It may also be noted that even in a case where a dielectric breakdown is normally effected across the space between the electrode 1 and the torch nozzle 2 by using the former circuit above, if the conductor extending from the DC power 4 to the plasma torch is long in length, the impedance provided by the conductor (here, the self-inductance provided by the conductor with the power supply being an HF power supply) will be increased, thus causing a delay in charge passage in the torch nozzle 2, then possibly permitting a discharge to occur jumping from the torch nozzle 2 to the standoff retention contact type cap 10*b* to allow electric charges to transfer (a current to be passed) in the latter circuit mentioned above.

In the event that a main arc is then established in the state mentioned, it can be seen that not only the normal arc current from the electrode 1 to the workpiece 8 will be generated but also a current path from the electrode 1 through the torch nozzle 2 and the standoff retention contact type cap 10*b* to the workpiece 8 will be established. The phenomenon in which an electric current is diverted into a portion other than a location at which a normal arc may occur is called an "abnormal arc", which when produced would render a working current magnitude deficient, thus deteriorating a weld or cut quality of the workpiece 8 and also quite shortening the life of a consumable part of the plasma torch such as the electrode 1 or the torch nozzle 2.

Next, the mechanism of an arc ignition that is produced when performing a welding or cutting operation for a workpiece 8 while holding the standoff retention contact type cap 10*b* of a plasma torch in contact with the workpiece 8 with a circuit construction in which the HF generator 5 is connected to the electrode 1 as shown in FIG. 3, will be explained with reference to FIG. 4.

In the circuit construction of FIG. 4, it will only be the circuit constituted by the HF generator 5—the first capacitor 7*a*13 the torch nozzle 2—the first dielectric space 6—the electrode 1 which may develop when the HF power supply is allowed to start operating. It appears, accordingly, that a dielectric breakdown would be effected only across the first dielectric space and will not give rise to any inconvenience such as a development of abnormal discharge.

In the actuality, however, it has been found that an abnormal discharge does frequently develop, thus quite shortening the life of a consumable part here too, as in a previously described case where the HF generator 5 is connected to the torch nozzle 2.

It should be noted that even in a case where a dielectric breakdown of the first dielectric space 6 is normally effected, an abnormal discharge may frequently occur if the conductor extending from the DC power supply 4 to the plasma torch is greater in length, thus providing a greater resistance (greater value in the self-inductance of the conductor). This will cause electric charges to pass with a delay through the torch nozzle 2 and in turn a discharge to jump from the torch nozzle 2 to the standoff retention contact type cap 10*b*, thus forming a short-circuited path connecting the torch nozzle 2 through the workpiece 8 with the HF generator 5 and producing an abnormal discharge.

With the foregoing problems taken into account, it is accordingly an object of the present invention to provide a plasma torch for performing a working operation with respect to a workpiece by flushing a plasma arc drawn from an electrode, together with a working gas introduced from around the electrode, from a torch nozzle against the workpiece while holding a portion of the plasma torch substantially in contact therewith, in which that a portion of the plasma torch which makes a contact with the workpiece can be composed of a metallic material which is high in thermal conductivity and that a high frequency electric current is prevented from leaking from the plasma torch into a region of the workpiece and an arc may not fail to be ignited.

SUMMARY OF THE INVENTION

In order to achieve the above mentioned object, there is provided in accordance with the present invention in a first form of embodiments thereof a plasma torch in which at least that portion of the said plasma torch for performing a working operation with respect to a workpiece by flushing out of a torch nozzle, a plasma arc drawn from an electrode together with a working gas that is introduced from a periphery of the electrode while holding a portion of the plasma torch substantially in contact with the workpiece, the improvement which may make a contact with the workpiece is composed of a non-insulating member and in which a high frequency current bypassing means is disposed between a site of the plasma torch that is equal in electric potential to the torch nozzle and a site of the plasma torch that is equal in electric potential to the workpiece.

According to the construction described above, it may be noted that where a high frequency power supply is allowed to start operating, after a dielectric breakdown is effected on a dielectric space between the electrode and the torch nozzle, electric charges are apparently passed with a delay through the torch nozzle with the resultant overflowing charges being freed via the said high frequency (HF) current bypassing means into the workpiece. And, after a pilot arc is produced the HF current bypassing means has its impedance becoming infinite, thereby only a normal arc can be generated with no abnormal discharge brought about.

In the construction described above, it is preferred that the said HF current bypassing means be disposed between said torch nozzle and a torch constituting member that is in contact with the workpiece and equal in electric potential to the workpiece, and be mounted to the said torch as associated with a body portion thereof.

It is also preferred that there be provided a conductor having a length less than 5 m for connecting the said HF current bypassing means in an electrical circuit.

The present invention also provides in a second form of embodiments thereof a plasma torch for performing a working operation with respect to a workpiece by flushing out of a torch nozzle, a plasma arc drawn from an electrode together with a working gas that is introduced from a periphery of the electrode while holding a portion of the plasma torch substantially in contact with the workpiece, in which there is provided a conductor having a length less than 3 mm for connecting the plasma torch to a direct current power supply. With such an arrangement it has been found that a substantially same result as mentioned above can be achieved here as well.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings.

BEST MODES FOR CARRYING OUT THE INVENTION

Hereinafter, suitable embodiments of the present invention with respect to a plasma torch will be set forth with reference to the accompanying drawings hereof.

As a result of the diligent performance of an extensive research and experimentation, the present inventors have discovered that in preventing the occurrence of an abnormal discharge, the following measures are effective:

(1) To shorten the length of a conductor connecting a plasma torch to a plasma power supply constituted by a DC source, and thereby reducing the self-inductance which the conductor provides to an extent that is sufficient to prevent an abnormal discharge from occurring; and (2) To cause electrical charges overflowing the torch nozzle when the high frequency power supply is allowed to start operating to be set free through a separate circuit into the workpiece 8 side or into a portion that is equal in electric potential to the workpiece 8.

Experiments carried out and the results thereof are set forth below.

[Experiment 1]

Purpose:

First, an investigation was conducted as to what extent of reduction of the length of a torch cable can prevent an abnormal discharge for the reason of a high frequency (HF) current from occurring.

Experimental equipment:

The following specification shown in Table 1 below was applied to the experimental equipment:

TABLE 1

| Item | Specification |
|---|---|
| DC Power Supply | Rated Current: 90 A, Rated Voltage: 150 V<br>HF Voltage: 15 kV |
| Plasma Torch | Rated Current: 90 A, Use Rate: 100% |
| Working Machine | Spot Welding Dedicated Hand Gun Type |
| Working Conditions | Working Current: 90 A<br>Gas Used: Ar<br>Flow Rate:<br>4 L/min. for Plasma Gas<br>7 L/min. for Shielding Gas |

Experimental Levels and Experimental Results:

The experimental results for the level 1 to 5 are those shown in Table 2 below.

TABLE 2

| | Torch Cable | Ignition Number | W. Material | Ab. Dis. Occ. |
|---|---|---|---|---|
| Level 1 | 10 m | 200 | W. C. Cu | 36 |
| Level 2 | 5 m | 200 | W. C. Cu | 25 |
| Level 3 | 3 m | 200 | W. C. Cu | 12 |
| Level 4 | 2 m | 200 | W. C. Cu | 0 |
| Level 5 | 0.5 m | 200 | W. C. Cu | 0 |

Figure 1:
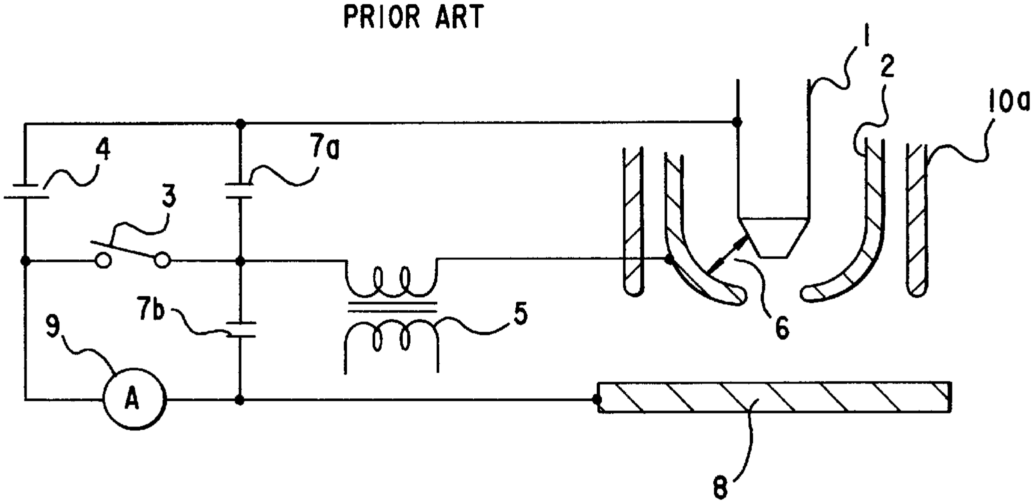
FIG.1 PRIOR ART
FIG. 1 is a circuit diagram that shows an electric circuit for a conventional plasma torch whose forward end is not brought into contact with a workpiece.
Figure 2:
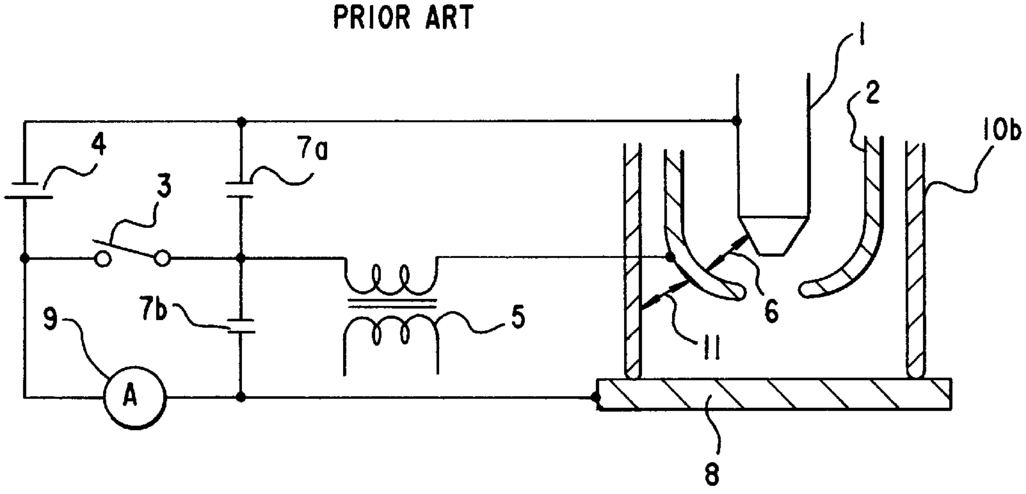
FIG.2 PRIOR ART
FIG. 2 is a circuit diagram that shows an electric circuit for a conventional plasma torch whose forward end is brought into contact with a workpiece.
Figure 3:
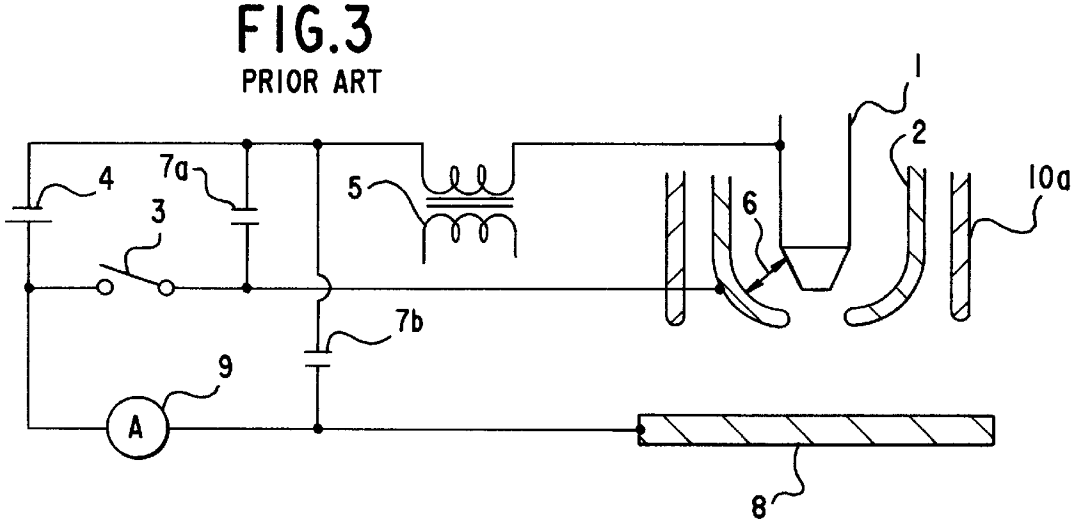
FIG.3 PRIOR ART
FIG. 3 is a circuit diagram that shows another electric circuit for a conventional plasma torch whose forward end is not brought into contact with a workpiece.
Figure 4:
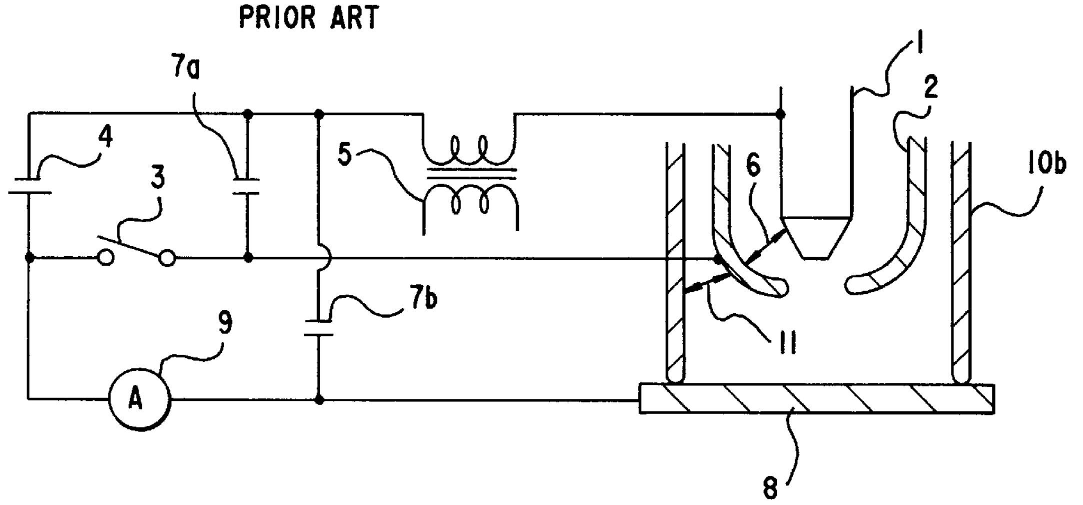
FIG.4 PRIOR ART
FIG. 4 is a circuit diagram that shows the electric circuit for a conventional plasma torch whose forward end is brought into contact with a workpiece.

W.: Workpiece, W. C. Cu.: Water Cooled Copper
Ab. Dis. Occ.: Abnormal Discharge Occurrences Conclusion:

It has been found that preventing an abnormal discharge due to an HF current from occurring requires the length of a torch cable to be less than about 3 m. For example, in an electrical circuit as shown in FIG. 2 or 4, it has been found that the distance between the DC power supply 4 and the electrode 1 needs to be less than 3 m.

Next, a study as to the measure (2) was conducted. To put the measure (2) into reality, it has been found that an additional circuit is required as having the ability to set electric charges free only when the high frequency power supply is allowed to start operating and as having the ability to hold a dielectric state (having a high resistance representing a dielectric or quasi-dielectric state) during a pilot arc and after it has shifted into a main arc and for this purpose a so-called HF bypassing means is effective.

Figure 5:
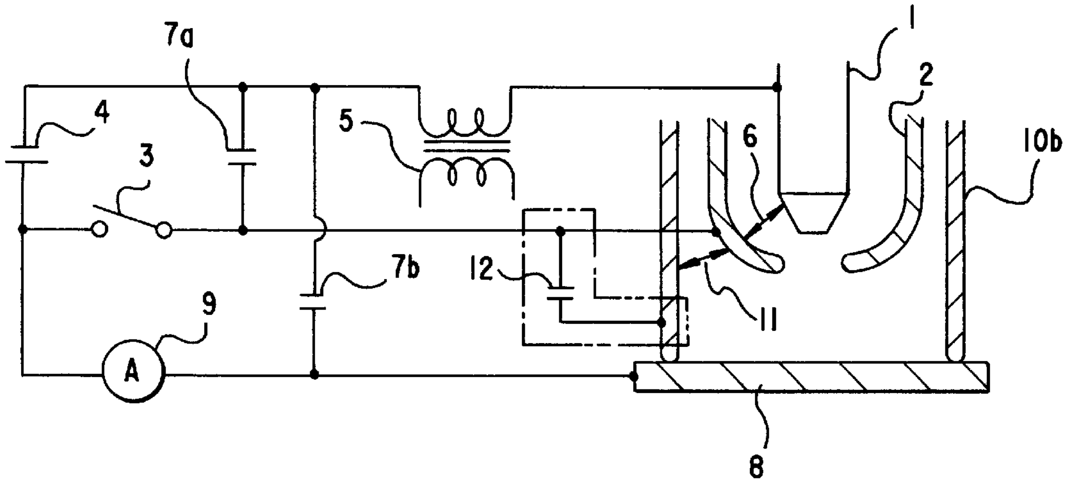
FIG. 5 is a circuit diagram that shows an electric circuit for use with a certain embodiment of the present invention directed to an improvement in plasma torch whose forward end is held substantially in contact with a workpiece.

Thus, the present inventors used as the HF current bypassing means a bypassing filter 12 with a capacitor as shown in FIG. 5 and incorporated it between the torch nozzle 2 and a standoff retention contact type cap 11*b* composed of a metallic material high in thermal conductivity and disposed in contact with and being equal in electric potential to the workpiece 8.

With such an arrangement, it has been found that with the bypassing filter 12 which, when the HF power supply is allowed to start operating, can be considered as having an impedance reduced to approximately zero, electric charges passing with a delay the torch nozzle 2 and overflowing the torch nozzle 2 can be freed via the the bypassing filter 12 and the standoff retention contact type cap 10*b* into a region of the workpiece 8 contacted thereby and made equal in electric potential thereto.

Thereafter, during a pilot arc and after it has shifted into a main arc which is a direct current, the bypassing filter 12 will have its impedance becoming infinite to permit no abnormal discharge and only a normal discharge to be effected.

The present inventors in an attempt to confirm this principle conducted the experiment mentioned below.

[Experiment 2]

Purpose:

To confirm that no abnormal discharge is allowed to occur if electric charges overflowing the nozzle when the HF power supply is allowed to start operating are freed via the bypassing filter 12 into the workpiece 8 or a site that is equal in electric potential thereto.

Experimental equipment:

The following specification shown in Table 3 below was applied to the experimental equipment:

TABLE 3

| Item | Specification |
|---|---|
| DC Power Supply | Rated Current: 90 A; Rated Voltage: 150 V |
| | HF Voltage: 15 kV |
| Plasma Torch | Rated Current: 90 A, Use Rate: 100% |
| Working Machine | Spot Welding Dedicated Hand Gun Type |
| Bypassing Filter | Capacitor Specification |
| | Capacitance: 0.1 μF |
| | Withstanding Voltage: 8 kV |
| | Cable Length: |
| | 5 m → Level 1 |
| | 4 m → Level 2 |
| | 3 m → Level 3 |
| | 2 m → Level 4 |
| | 1 m → Level 5 |
| | 0.5 m → Level 6 |
| | Plasma Gas Flow rate: 4 L/min. |
| | 0.5 m Level 7 |
| | Plasma Gas Flow rate: 2 L/min. |

Experimental Levels and Results:

The experimental results for the experimental levels 1 to 7 are those as shown in Table 4 below.

TABLE 4

| | Ignition Number | Workpiece Material | Ab. Dis. Occ |
|---|---|---|---|
| Level 1 | 200 | Water Cooled Copper | 2 |
| Level 2 | 200 | Water Cooled Copper | 0 |
| Level 3 | 200 | Water Cooled Copper | 0 |
| Level 4 | 200 | Water Cooled Copper | 0 |
| Level 5 | 200 | Water Cooled Copper | 0 |
| Level 6 | 5000 | Water Cooled Copper | 0 |
| Level 7 | 5000 | Water Cooled Copper | 0 |

Conclusion:

By incorporating a HF current bypassing filter between a site of the plasma torch that is equal in electric potential to the torch nozzle 2 and a site of the plasma torch that is equal in electric potential to the workpiece 8, it has been found that electric charges overflowing the torch nozzle 2 when the HF power supply is allowed to commence operation will be freed via the bypassing filter 12 into a region of the workpiece 8 or a site that is equal in electric potential thereto, thereby preventing an abnormal discharge. Also, inasmuch as the voltage level prevailing between the torch nozzle 2 and the workpiece 8 is about one third to one half of the HF voltage, it has been found that an addition of the bypassing filter 12 will reduce the duration in which the said voltage is prevailing from about 4μ seconds to about 1.2μ second.

Should the cable length for the bypassing filter 12 exceed 5 m, however, it has been found that an increased impedance then provided may permit an abnormal discharge to occur. Accordingly, the length of 5 m can be considered as an acceptable minimum length of the cable for the bypassing filter 12. For the maximum achievement of this effect, it is therefore recommended that the bypassing filter be located inside of the plasma torch or in the vicinity thereof, thereby minimizing the cable length.

It should also be noted that if the cable length can be minimized, the bypassing filter 12 may have one end thereof connected to the workpiece 8 each time a working operation should be carried out.

As set forth in the foregoing description, it will be apparent that the present invention provides the advantages listed below.

(1) By incorporating an HF current bypassing filter, that may be a bypassing filter 12, between a site of the plasma torch that is equal in electric potential to the torch nozzle 2 and a site of the plasma torch that is equal in electric potential to a workpiece, electric charges overflowing the torch nozzle 2 when the HF power supply is allowed to commence operation can be freed via the bypassing filter 12 into a region of the workpiece 8. This effectively prevents an abnormal discharge from occurring due to a HF current in a plasma welding or cutting operation which is carried out for a workpiece while holding a portion of a plasma torch constituting member such as a standoff retaining member that forms the forward end of the plasma torch and composed of a metallic material substantially in contact with the workpiece.

(2) The portion which is composed of a metallic material such as copper that is high in thermal conductivity and which may make a contact with the workpiece 8 can be used while being water cooled, thus permitting the life of a part of the plasma torch to be largely prolonged.

(3) By disposing an HF current bypassing means, that may be the bypassing filter 12, inside of the plasma torch or in the vicinity thereof, the effect of preventing an abnormal discharge in the plasma torch is markedly enhanced.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all the equivalents thereof.

What is claimed is:

1. A plasma torch for performing a working operation with respect to a workpiece by discharging, through a torch nozzle, a plasma arc drawn from an electrode together with a working gas that is introduced from a periphery of the electrode while holding a portion of the plasma torch substantially in contact with the workpiece, comprising:

at least a portion of said plasma torch, which is in contact with the workpiece, is composed of a non-insulating member; and a high frequency bypassing means is disposed between said torch nozzle and said non-insulating member which is in contact with the workpiece and equal in electric potential to the workpiece, said high frequency bypassing means being mounted to said torch as associated with a body portion and its vicinity thereof.

2. The improvement set forth in claim 1, comprising a conductor having a length less than 5 m for connecting said high frequency current bypassing means in an electrical circuit.

3. In a plasma torch for performing a working operation with respect to a workpiece by discharging, through a torch nozzle, a plasma arc drawn from an electrode together with a working gas which is introduced from a periphery of the electrode while contacting, to the workpiece, a portion of the plasma torch other than the torch nozzle and a portion being substantially of same potential as the torch nozzle, comprising:

the contacting portion of the plasma torch to the workpiece is composed of a non-insulating member insulated from the torch nozzle; and a high frequency bypassing means is disposed between said torch nozzle and said non-insulating member contacting the workpiece and equal in electric potential to that of the workpiece, said high frequency bypassing means being mounted to the torch as associated with a body portion thereof for quickly discharging high frequency charge generated to the torch nozzle.

4. The improvement set forth in claim 3, comprising a conductor having a length less than 5 m for connecting said high frequency current bypassing means in an electrical circuit.

5. In a plasma torch for performing a working operation with respect to a workpiece by discharging, through a torch nozzle, a plasma arc drawn from an electrode together with a working gas which is introduced from a periphery of the electrode while contacting a portion of the plasma torch to the workpiece, comprising:

a D.C. power source connected to the plasma torch has a high frequency bypassing means disposed between a torch nozzle and a work conductor arrangement disposed inside the power source, wherein the contacting portion of the plasma torch to the workpiece is composed of a non-insulating member which is insulated from the torch nozzle and said D.C. power source and said plasma torch are connected by means of a conductor having a length less than 3 m.

* * * * *